US010957106B2

(12) United States Patent
Nakajima et al.

(10) Patent No.: US 10,957,106 B2
(45) Date of Patent: Mar. 23, 2021

(54) IMAGE DISPLAY SYSTEM, IMAGE DISPLAY DEVICE, CONTROL METHOD THEREFOR, AND PROGRAM

(71) Applicant: SONY INTERACTIVE ENTERTAINMENT INC., Tokyo (JP)

(72) Inventors: Satoshi Nakajima, Tokyo (JP); Tomokazu Kake, Tokyo (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 0 days.

(21) Appl. No.: 16/342,773

(22) PCT Filed: Oct. 27, 2017

(86) PCT No.: PCT/JP2017/038936
§ 371 (c)(1),
(2) Date: Apr. 17, 2019

(87) PCT Pub. No.: WO2018/084087
PCT Pub. Date: May 11, 2018

(65) Prior Publication Data
US 2019/0259211 A1      Aug. 22, 2019

(30) Foreign Application Priority Data
Nov. 1, 2016   (JP) .............................. JP2016-214420

(51) Int. Cl.
*A63F 13/52*     (2014.01)
*G02B 27/02*     (2006.01)
(Continued)

(52) U.S. Cl.
CPC ............ *G06T 19/006* (2013.01); *A63F 13/52* (2014.09); *G02B 27/02* (2013.01); *G06T 19/00* (2013.01); *G09G 5/00* (2013.01); *G09G 5/377* (2013.01)

(58) Field of Classification Search
CPC ............................... G06T 19/006; A63F 13/52
See application file for complete search history.

(56) References Cited

U.S. PATENT DOCUMENTS

2008/0024523 A1*  1/2008  Tomite .................... G06T 15/50
                                                                      345/632
2013/0100132 A1*  4/2013  Katayama ............ H04N 13/275
                                                                      345/420
(Continued)

FOREIGN PATENT DOCUMENTS

JP      2006-53694 A       2/2006
JP      2008-33531 A       2/2008
JP      2008-234473 A     10/2008

OTHER PUBLICATIONS

International Preliminary Report on Patentability dated May 7, 2019, from International Application No. PCT/JP2017/038936, 13 sheets.

(Continued)

*Primary Examiner* — Jitesh Patel
(74) *Attorney, Agent, or Firm* — Katten Muchin Rosenman LLP (57) ABSTRACT

An image processing apparatus connected to a display device to be mounted on the head of a user acquires panoramic image data representing a captured image around the user and generates background image data representing the panoramic image data projected onto a projection plane having a predetermined shape that is virtually disposed around the position of a user's viewpoint in a virtual space. The image processing apparatus synthesizes model image data generated on the basis of predetermined three-dimensional model data with the background image data, thereby generating synthesized image data, and outputs a visual field (Continued)

image of the user generated on the basis of the synthesized image data to the display device.

5 Claims, 4 Drawing Sheets

(51) Int. Cl.
*G09G 5/00* (2006.01)
*G09G 5/377* (2006.01)
*G06T 19/00* (2011.01)

(56) References Cited

U.S. PATENT DOCUMENTS

| | | | | |
|---|---|---|---|---|
| 2014/0240312 A1* | 8/2014 | Vesely | ............... | H04N 13/366 |
| | | | | 345/419 |
| 2014/0354690 A1* | 12/2014 | Walters | ............... | H04W 4/029 |
| | | | | 345/633 |
| 2015/0269438 A1* | 9/2015 | Samarasekera | .... | G06K 9/00637 |
| | | | | 382/154 |
| 2015/0321103 A1* | 11/2015 | Barnett | ............. | G02B 27/2228 |
| | | | | 345/419 |
| 2016/0353090 A1* | 12/2016 | Esteban | ............. | G02B 27/0172 |

OTHER PUBLICATIONS

International Search Report and Written Opinion dated Dec. 12, 2017, from International Application No. PCT/JP2017/038936, 9 sheets.

\* cited by examiner

IMAGE DISPLAY SYSTEM, IMAGE DISPLAY DEVICE, CONTROL METHOD THEREFOR, AND PROGRAM

TECHNICAL FIELD

The present invention relates to an image display system, an image display device, a control method therefor, and a program.

BACKGROUND ART

There is an image display system, such as an HMD (Head Mount Display), to be mounted on the head of the user for presenting left- and right-eye images respectively to the left and right eyes of the user for stereoscopic vision. In order for such an image display system to display a panoramic image such as a so-called entire celestial sphere image, the image display system generates a projected image where a panoramic image is projected onto a virtual sphere with a user's viewpoint at its center. The image display system then displays on a display device an image within the projected image that falls in the range of the user's visual field. When the user moves its head to move the range of its visual field, the user is able to see an image within the panoramic image which lies in the direction of the user's visual field.

SUMMARY

Technical Problem

Among such HMDs is a so-called non-transmissive HMD that does not allow the user to view the real image around the user. If a video image representing a virtual game space, for example, is displayed on a non-transmissive HMD, then when the user wears the HMD, the user suddenly goes from the real space into the virtual game space displayed on the HMD. Such an abrupt scene change may impair the user's sense of immersion in the virtual game space.

The present invention has been made in view of the above problems. It is an object of the present invention to provide an image display system, an image display apparatus, a control method therefor, and a program which allow the user to have an increased sense of immersion.

Solution to Problem

According to an aspect of the present invention for solving the conventional problems referred to above, there is provided an image processing apparatus connected to a display device to be mounted on the head of a user, including means that acquires panoramic image data representing a captured image around the user and generates background image data representing the panoramic image data projected onto a projection plane having a predetermined shape that is virtually disposed around the position of a user's viewpoint in a virtual space, means that synthesizes model image data generated on the basis of predetermined three-dimensional model data with the background image data, thereby generating synthesized image data, and output means that outputs a visual field image of the user generated on the basis of the synthesized image data to the display device.

Advantageous Effect of Invention

According to the present invention, the user is allowed to have an increased sense of immersion.

DESCRIPTION OF EMBODIMENTS

Figure 1:
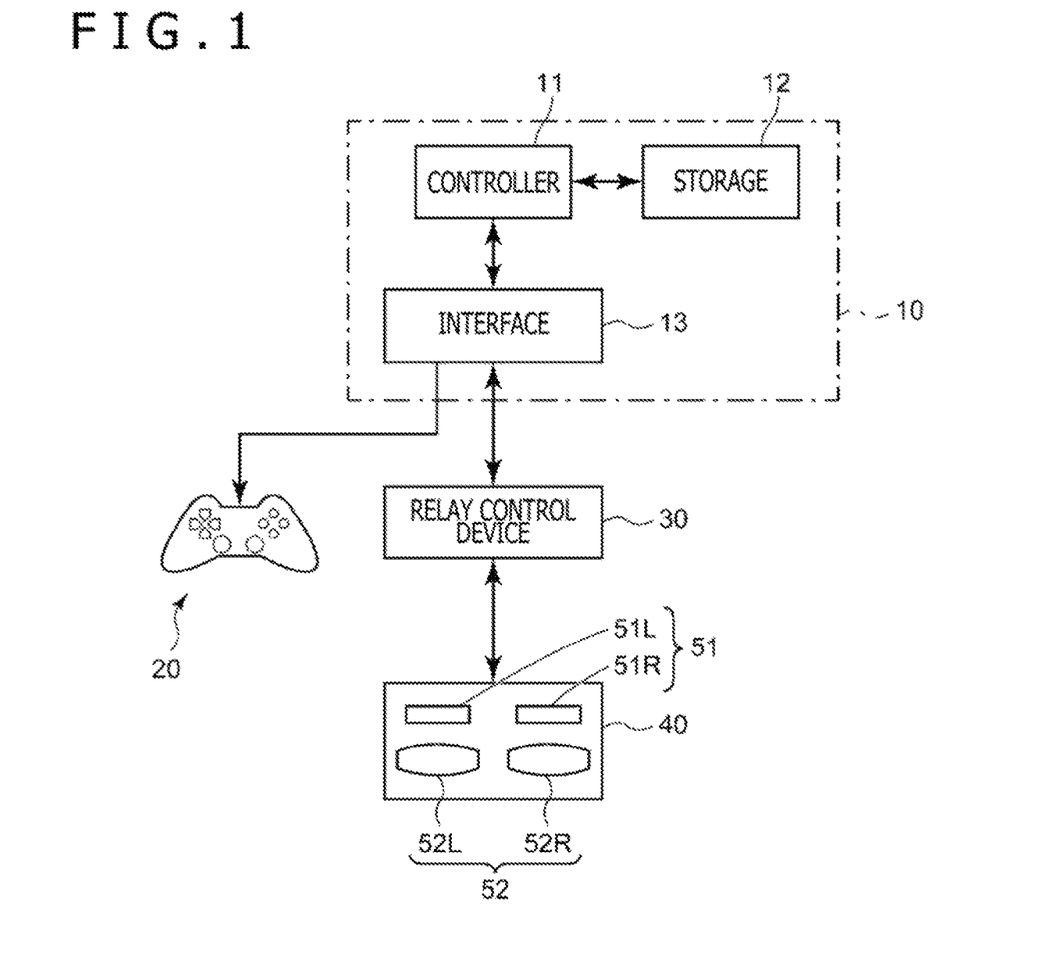
FIG. 1 is a block diagram illustrating a configurational example of an image display system including an image processing apparatus according to an embodiment of the present invention.

An embodiment of the present invention will be described below with reference to the drawings. As illustrated in FIG. 1, an image processing system 1 including an image processing apparatus 10 according to the embodiment of the present invention includes the image processing apparatus 10, an operating device 20, a relay controller 30, and a display device 40.

The image processing apparatus 10 is an apparatus for supplying image data representing an image to be displayed by the display device 40. The image processing apparatus 10 may, for example, be a game machine for home use, a portable game machine, a personal computer, a smartphone, a tablet, or the like. As illustrated in FIG. 1, the image processing apparatus 10 includes a controller 11, a storage 12, and an interface 13.

The controller 11 is a program-controlled device such as a CPU (central processing unit) or the like, and executes programs stored in the storage 12. According to the present embodiment, the controller 11 acquires panoramic image data representing a captured image around the user. The controller 11 also generates background image data that represent the panoramic image data projected onto a projection plane of a predetermined shape which is virtually disposed around the position of the user's viewpoint in a virtual space. Then, the controller 11 combines model image data generated on the basis of predetermined three-dimensional model data with the background image data, thereby generating synthesized image data. The controller 11 outputs a user's visual field image generated on the basis of the synthesized image data. Details of this operation of the controller 11 will be described later.

The storage 12 includes at least one memory device such as a RAM (random access memory) or the like, and stores the programs to be executed by the controller 11. The storage 12 also operates as a working memory for the controller 11 and stores data to be used during the course of execution of the programs by the controller 11. The programs may be stored in a computer-readable, non-transitory recording medium and may be provided therefrom to and stored in the storage 12.

According to an example of the present embodiment, furthermore, the storage 12 may store panoramic image data representing a captured image of the room where the user is present. According to an example of the present embodiment, the panoramic image data may be the image data of the entire celestial sphere image.

The interface 13 is an interface that allows the controller 11 of the image processing apparatus 10 to perform data communication between the operating device 20 and the relay controller 30. The image processing apparatus 10 is connected to the operating device 20 and the relay controller 30 through the interface 13 via a wired or wireless link. For example, the interface 13 may include a multimedia interface such as HDMI (registered trademark), which stands for High-Definition Multimedia Interface, for sending image data or anamorphic image data and voice data to the relay controller 30. Moreover, the interface 13 may include a data communication interface such as USB (universal serial bus) or the like for receiving various pieces of information from the display device 40 through the relay controller 30 and sending control signals, etc. to the display device 40 through the relay controller 30. Furthermore, the interface 13 may include a data communication interface such as USB or the like for receiving signals representing the contents of user's operation inputs that are applied to the operating device 20.

The operating device 20, which may be a controller for a home-use game machine or the like, is used by the user to send various instructions to the image processing apparatus 10. The contents of user's operation inputs that are applied to the operating device 20 are sent to the image processing apparatus 10 via the wired or wireless link. The operating device 20 may not necessarily be separate from the image processing apparatus 10, but may include operating buttons, a touch panel, or the like disposed on a surface of a casing of the image processing apparatus 10.

The relay controller 30 is connected to the display device 40 and receives image data supplied from the image processing apparatus 10. The relay controller 30 generates image data by rearranging the entered image data according to the array of pixels of displays D of video display elements 51, described later, of the display device 40, and, if necessary, perform a process of correcting an image represented by the supplied image data depending on a distortion caused by an optical system of the display device 40, and outputs video signals representing the corrected image.

The video signals output from the relay controller 30 to the display device 40 include two video signals, i.e., a video signal for the left eye of the user and a video signal for the right eye of the user. The relay controller 30 also relays, other than the video signals, various pieces of information, such as voice data and control signals, to be sent and received between the image processing apparatus 10 and the display device 40. The image processing apparatus 10 may include a function as the relay controller 30. In such a case, the image processing apparatus 10 may output video signals including two video signals for the left and right eyes to the display device 40. Therefore, the relay controller 30 may not necessarily be separate from the image processing apparatus 10.

The display device 40 is a display device that is mounted on the head of the user in use. The display device 40 displays video images represented by video signals input from the relay controller 30 for the user to see. According to the present embodiment, the display device 40 displays video images each corresponding to the respective left and right eyes of the user in front of the respective eyes. As illustrated in FIG. 1, the display device 40 is configured by including video display elements 51 and optical elements 52.

The video display elements 51, which are organic EL display panels, liquid crystal display panels, or the like, display video images according to instructions entered from the relay controller 30. The video display elements 51 may be a single display element for displaying a video image for the left eye and a video image for the right eye in an array or a pair of display elements for displaying a video image for the left eye and a video image for the right eye, independently of each other. According to another example of the present embodiment, the screen of a smartphone may be used as the video display elements 51. Furthermore, the display device 40 may be a retina-irradiation-type or retina-projection-type device for projecting video images directly onto user's retinas. In such a case, the video display elements 51 may include a laser for emitting light and an MEMS (Micro Electro Mechanical Systems) mirror for scanning the light.

The optical elements 52, which may be holograms, prisms, half mirrors, or the like, are disposed in front of the eyes of the user and transmit or refract the light of video images displayed by the video display elements 51 into the eyes of the user. Specifically, the optical elements 52 include a left-eye optical element 52L and a right-eye optical element 52R. The video image for the left eye that is displayed by the video display elements 51 may be applied through the left-eye optical element 52L to the left eye of the user, whereas the video image for the right eye that is displayed by the video display elements 51 may be applied through the right-eye optical element 52R to the right eye of the user. When the display device 40 is mounted on the head of the user, the user is able to see the video image for the left eye with the left eye and to see the video image for the right eye with the right eye. According to the present embodiment, the display device 40 is a non-transmissive display device that does not allow the user to view how the outside world looks.

Figure 2:
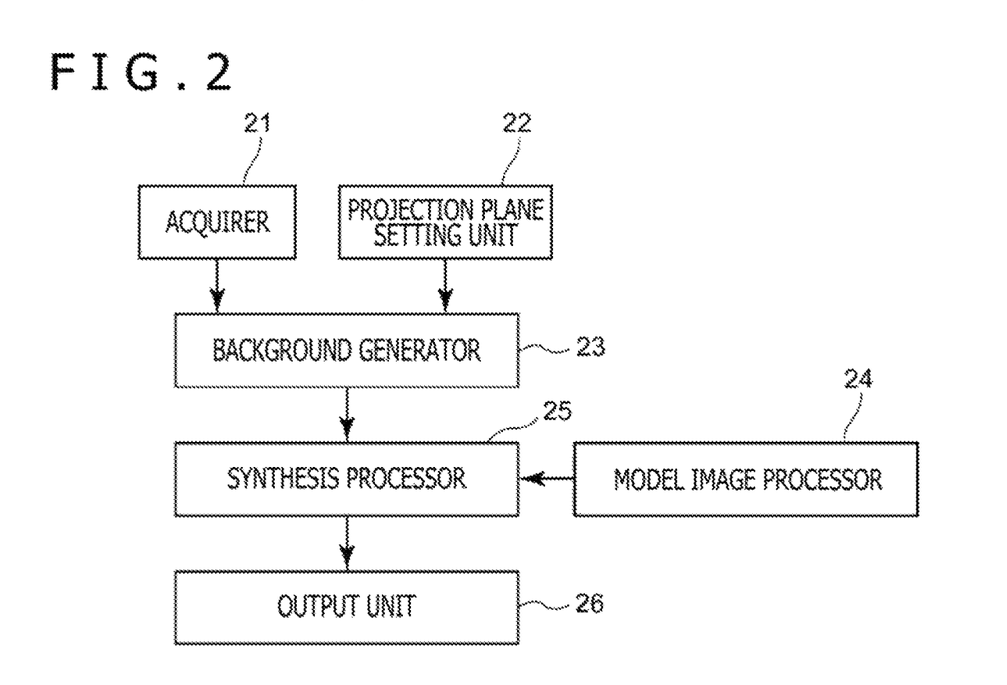
FIG. 2 is a functional block diagram illustrating an example of the image processing apparatus according to the embodiment of the present invention.

Next, operation of the controller 11 of the image processing apparatus 10 will be described below. According to the present embodiment, as illustrated in FIG. 2, the controller 11 is functionally configured by including an acquirer 21, a projection plane setting unit 22, a background generator 23, a model image processor 24, a synthesis processor 25, and an output unit 26.

The acquirer 21 acquires panoramic image data representing a captured image around the user. According to an example of the present embodiment, it is assumed that panoramic image data representing a captured image of the room where the image processing apparatus 10 is installed have been stored in advance in the storage 12. As the panoramic image data can be captured using an entire celestial sphere camera, a smartphone having a function for capturing panoramic images, or the like, the panoramic image data will not be described in detail below.

The projection plane setting unit 22 sets a projection plane onto which the panoramic image data acquired by the acquirer 21 has acquired are to be projected. According to an example of the present embodiment, the projection plane setting unit 22 sets, as such a projection plane, a virtual sphere having a radius R with the position of a user's viewpoint, which has been determined in advance as the central position between the eyes of the user, at its center. In this example, there is established a virtual plane to which the direction of the line of sight of the user, which may be an initial direction determined when the user initially wears the display device 40 on its head, is normal, and an axis along a line segment produced by projecting a line segment along the gravitational direction onto the established virtual plane is regarded as a Z-axis, where an upward vertical direction therealong is defined as a positive direction. The direction of the line of sight of the user extends along a Y-axis, where the direction along the line of sight of the user is defined as a positive direction. Directions perpendicular to the Z-axis and the Y-axis extend along an X-axis, where a direction oriented from the left hand to right hand of the user therealong is defined as a positive direction. The X-, Y-, and Z-axes jointly make up a three-dimensional XYZ coordinate system, conveniently referred to as a world coordinate system, with the user's viewpoint being positioned at the center (0, 0, 0) of the world coordinate system.

The radius R of the virtual sphere may be determined depending on the extent of the room where the user is present, for example, or may be given as a predetermined value. If the radius R is to be determined depending on the extent of the room, then the projection plane setting unit 22 may ask the user to enter the size of the room where the user is present, e.g., the area of the room or the transverse, longitudinal, and vertical dimensions of the room, etc., and may determine the extent of the room depending on the values entered by the user.

The background generator 23 generates background image data by projecting the panoramic image data acquired by the acquirer 21 onto the projection plane set by the projection plane setting unit 22. The process of generating such a projected image may employ a widely known texture mapping technology for positioning panoramic image data within a virtual sphere, and will not be described in detail below.

The model image processor 24 acquires three-dimensional model data instructed by the user or designated by a game application or other applications. The acquired three-dimensional model data may include a plurality of three-dimensional model data. In such a case, the three-dimensional model data have relative layout positions designated by coordinate information of coordinate systems, referred to as local coordinate systems, inherent in the three-dimensional model data. The model image processor 24 generates model image data based on the acquired three-dimensional model data. Specifically, the model image generator 24 generates model image data representing a plurality of three-dimensional model data of virtual three-dimensional objects such as chairs, cables, or the like, placed in positions designated by the coordinate information of the local coordinate systems, for example.

In the description that follows, of the planes of a virtual circumscribed rectangular parallelepiped that is circumscribed around a virtual object included in the model image data, a plane in a predetermined direction, i.e., a plane in a negative direction along a $\zeta$-axis with respect to a circumscribed rectangular parallelepiped having planes to which the $\xi$-, $\eta$-, and $\zeta$-axes of a $\xi\eta\zeta$ orthogonal coordinate system as a local coordinate system are normal, is regarded as a bottom plane of the model image data.

The synthesis processor 25 places the model image data generated by the model image processor 24 against a background represented by the background image data generated by the background generator 23, at a position represented by predetermined coordinate information, i.e., a position where the bottom plane of the model image data, for example, is held in contact with an XY plane that is L lower than the position of the user's viewpoint along the Z-axis of the world coordinate system (Z=−L). In other words, the synthesis processor 25 generates synthesized image data by placing the virtual object represented by the model image data at the position represented by the above coordinate information. The synthesis processor 25 sets positions along the X- and Y-axes as if they virtually look before the user's eyes in the direction of the line of sight of the user.

Specifically, the synthesis processor 25 may set a position along the X-axis ahead of the user (X=0 and may set position along the Y-axis a predetermined distance ahead of the user (Y=y, where y is a value sufficiently smaller than the radius R of the virtual sphere as the projection plane, y>0). The synthesis processor 25 determines the gradient of the model image data in a YZ plane according to a predetermined process. In an example, the normal directions of $\xi$, $\eta$, and $\zeta$ may be aligned with the normal directions X, Y, Z of the world coordinate system.

Furthermore, the synthesis processor 25 acquires information about the position of the user's viewpoint and the direction of the line of sight of the user. Specifically, the synthesis processor 25 tracks movement of the user's head, i.e., detects movement of the user's head at predetermined timings, detects the position and direction of the user's head, and acquires information about the position of the user's viewpoint and the direction of the line of sight of the user. A well known process may be used to acquire information about the position of the user's viewpoint and the direction of the line of sight of the user.

Based on the synthesized image data, the synthesis processor 25 renders and generates an image in the range of the user's visual field in the direction of the line of sight of the user, i.e., a visual field image, as viewed from the position of the user's viewpoint specified by the acquired information. This rendering and gendering process may be a general process of generating three-dimensional graphic images to render virtual objects by setting the position and direction of a virtual camera. The output unit 26 outputs the visual field image generated by the synthesis processor 25 to the display device 40.

According to the present embodiment, each time the position of the user's viewpoint and the direction of the line of sight of the user vary, the synthesis processor 25 renders a visual field image based on synthesized image data and outputs the rendered visual field image to the output unit 26. Consequently, when the user moves its head to vary the position of the user's viewpoint and the direction of the line of sight of the user, the user can visually recognize an image that is present in the panoramic image in the direction of the line of sight of the user as viewed from the position of the user's viewpoint, and, if there is an image in the visual field in the image of the virtual object generated on the basis of the model image data, the user can visually recognize such an image as a foreground.

With the image processing apparatus 10 arranged as described above according to the present embodiment, when the user wears the display device 40, it displays the panoramic image of the room where the user is present as a background and also displays a virtual object rendered on the basis of model image data as a foreground. Therefore, it is possible to place a virtual object based on three-dimensional model data representing a virtual game space on the image of the top plate of a desk included in the panoramic image, for example, and to create a rendition to enter the virtual object, i.e., to virtually move the viewpoint into the virtual object, by the user's operation of the operating device 20. A transition into the game space is thus naturally rendered to increase the user's sense of immersion in the game space.

However, when the image of a virtual object rendered by arithmetic operations based on three-dimensional model data is synthesized with a panoramic image, the user may feel strange and awkward in a situation given below.

Figure 3:
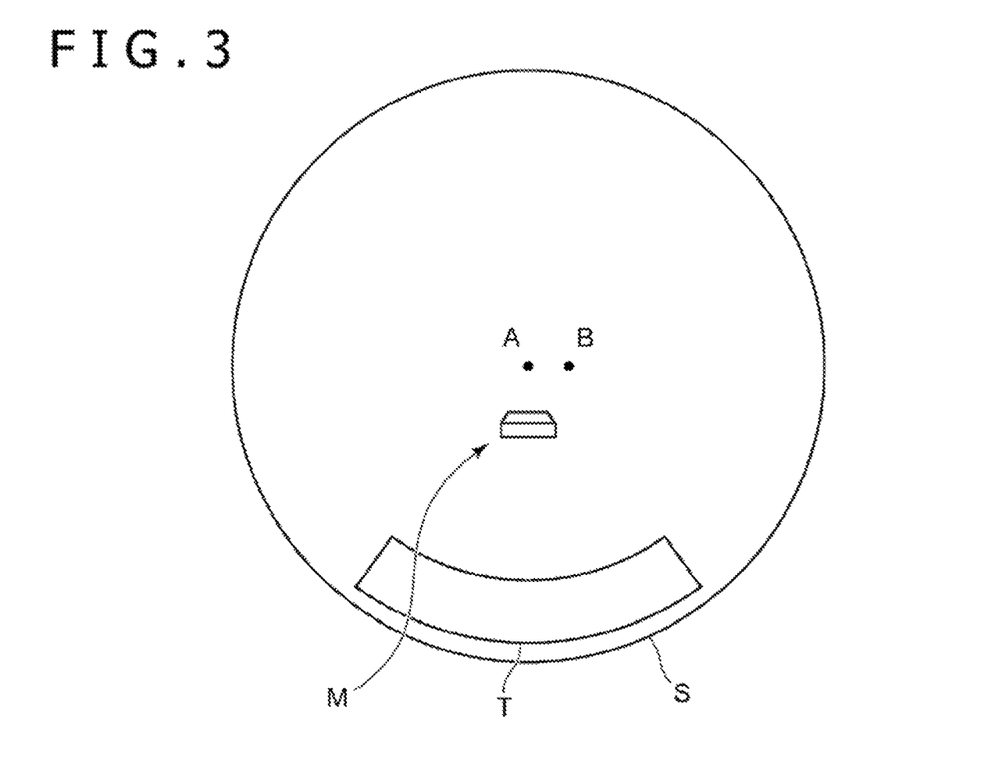
FIG. 3 is a diagram illustrating an example of a projection plane established by the image processing apparatus according to the embodiment of the present invention.

As illustrated in FIG. 3, when a virtual object M based on model image data is placed at a position where a desk top plate T projected onto a projection plane S of a sphere of a panoramic image is displayed, the desk top plate T of the panoramic image is represented by an image projected onto the spherical projection plane S whereas the synthesized virtual object M based on the model image data is represented by an image placed on a flat plane. Therefore, when the user moves its head to move its visual field from A to B in FIG. 3, though the panoramic image as the background does not move essentially, the virtual object that is visually recognized as being initially placed on the desk is displayed with its orientation changed greatly, making the user feel strange and awkward.

In view of the above problem, the image processing apparatus 10 according to the present embodiment may operate as follows: The projection plane setting unit 22 of the controller 11 of the image processing apparatus 10 according to the present embodiment may operate to set a projection plane whose portion below at least the position of the user's viewpoint is a flat plane.

Figure 4:
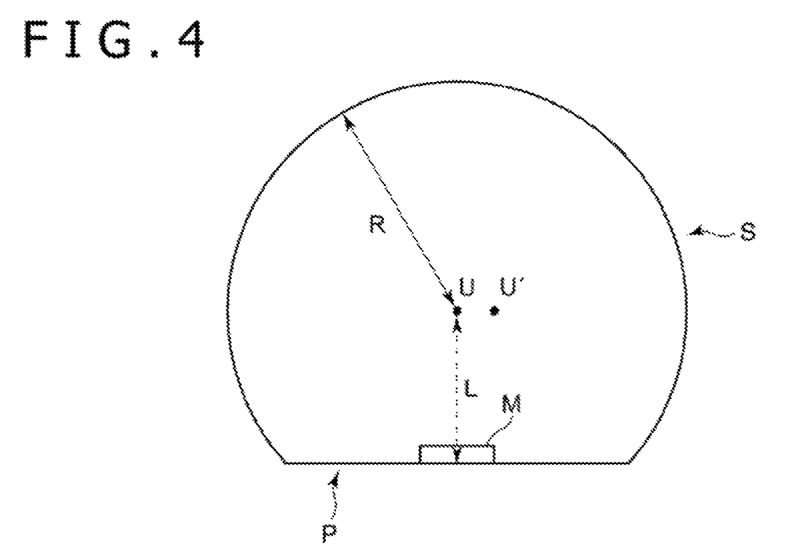
FIG. 4 is a diagram illustrating an example of another projection plane established by the image processing apparatus according to the embodiment of the present invention.

Specifically, as schematically illustrated in FIG. 4, the projection plane setting unit 22 places a flat projection plane P that is a distance L, which corresponds to the position of the bottom plane of the model image data, lower than the position U of the user's viewpoint, and makes a projection plane above the projection plane P as a part S of a sphere whose radius is represented by R (R>L) and whose center is located at the position U of the user's viewpoint.

The background generator 23 projects the panoramic image data acquired by the acquirer 21 onto the projection plane set by the projection plane setting unit 22, thereby generating background image data.

The synthesis processor 25 places the bottom plane of the model image data generated by the model image processor 24 on the flat projection plane P against a background, i.e., an image at infinity, represented by the background image data generated by the background generator 23. In other words, the synthesis processor 25 places the model image data such that the bottom plane of the model image data is in contact with the position that is L lower than the position of the user's viewpoint along the Z-axis that represents the gravitational direction.

Then, the synthesis processor 25 acquires information about the position of the user's viewpoint and the direction of the line of sight of the user, and renders and generates an image in the range of the user's visual field in the direction of the line of sight of the user, i.e., a visual field image, as viewed from the position of the user's viewpoint specified by the acquired information, based on the synthesized image data where the image of the virtual object represented by the model image data is placed at the above position.

According to the above process, the virtual object represented by the model image data is visually recognized as being placed on the flat projection plane P. Since a plane such as a desk top plate or the like in a real space is generally below the position of the user's viewpoint, the image of the desk top plate or a floor surface, of images captured in a panoramic image, is projected onto the flat projection plane P. Therefore, even when the user moves its head to change the user's visual field from U to U' in FIG. 4, since the background panoramic image and the model image are seen as being integral with each other, the user feels less strange and awkward. According to another example, the projection plane setting unit 22 according to the present embodiment may set a projection plane in the form of a hexahedron such as a rectangular parallelepiped or the like, rather than a sphere. If the projection plane setting unit 22 according to the present embodiment sets a projection plane in the form of a hexahedron, then the position of the bottom plane of the projection plane, which is located downwardly along the Z-axis, is L lower than the position of the user's viewpoint, and the bottom plane of the projection plane lies parallel to the real floor surface to which the Z-axis is normal.

Moreover, according to an example of the present embodiment, the projection plane setting unit 22 and the background generator 23 may set a projection plane based on the panoramic image data acquired by the acquirer 21. In an example, the projection plane setting unit 22 according to the present embodiment sets, as projection planes, a plurality of virtual spheres having respective centers at the position of the user's viewpoints and having respective radii ri ($i=1, 2, \ldots, n$, where $r1>r2> \ldots >rn$).

The background generator 23 carries out a region dividing process on the panoramic image data acquired by the acquirer 21. The region dividing process may be a known process such as graph cuts or the like, for example.

The background generator 23 performs a labeling process on regions obtained from the panoramic image data by the region dividing process. For example, the background generator 23 calculates average values of hue represented by pixel values in the regions, and assigns common labels to those regions where the difference between the calculated average values of hue is smaller than a predetermined threshold value, thereby labeling the regions. In this example, the same label is assigned to a plurality of regions where the difference between the respective hue values is smaller than the threshold value. This process has taken into account the fact that while a wall is relatively common in hue, an object that is disposed in front of the wall is generally different in hue from the wall. However, the labeling process according to the present embodiment is not limited to the illustrated process.

The background generator 23 determines the sum of areas of the regions to which each of the labels is assigned. If there is only one region to which a label is assigned, then the background generator 23 determines an area of that region. Then, the background generator 23 uses a plurality of predetermined area threshold values $Ath\_1, Ath\_2, \ldots, Ath\_n$ ($Ath\_1>Ath\_2> \ldots >Ath\_n$), and assigns estimated distance labels i to regions whose areas are smaller than the area threshold values $Ath\_(i-1)$ and equal to or larger than the area threshold values $Ath\_i$ where $i=1, 2, \ldots, n$, $Ath\_0$ being infinite.

The background generator 23 projects partial image data in the region to which the estimated distance label i is assigned, by way of texture mapping, onto a range to which there correspond projection planes represented by a plurality of predetermined virtual spheres having respective centers at the position of the user's viewpoints and having respective radii ri ($i=1, 2, \ldots, n$). In the absence of regions to which estimated distance labels k are assigned, nothing is projected onto projection planes represented by virtual spheres having respective radii rk. The virtual spheres each correspond to a respective plurality of projection planes that are virtually placed at positions where the distances from the position of the user's viewpoint are different from each other.

According to this example, since panoramic data are divided into regions, and, based on distances estimated with respect to the respective regions, partial image data of the regions are projected onto projection planes at the corresponding distances, thereby generating background image data, the user feels less strange and awkward.

In this example, too, the projection plane setting unit 22 may place a single flat projection plane P that is a distance L, which corresponds to the position of the bottom plane of the model image data, lower than the position U of the user's viewpoint. In this case, the background generator 23 projects partial image data, of the panoramic image data, in a portion to be projected the distance L or more lower than the position U of the user's viewpoint, onto the projection plane P by way of texture mapping, independent of the regions obtained by the region dividing process.

[Setting of a Projection Plane Based on the Position Where a Virtual Object is Placed]

In the description thus far, the synthesis processor 25 places model image data such that the bottom plane of a circumscribed rectangular parallelepiped, i.e., the bottom plane of the model image data, circumscribed around virtual objects M1, M2, . . . included in the model image data is in contact with the flat projection plane set by the projection plane setting unit 22. However, the present embodiment is not limited to such a process.

Specifically, according to an example of the present embodiment, the synthesis processor 22 may set a projection plane such that a designated one of the planes of a circumscribed rectangular parallelepiped B circumscribed around virtual objects M1, M2, . . . included in the model image data is in contact with the projection plane.

In this example, specifically, the projection plane setting unit 22 accepts information designating which direction of the world coordinate system model image data should be placed in. The information designating the direction may be represented by a vector (x, y, z) indicative of the direction.

Figure 6:
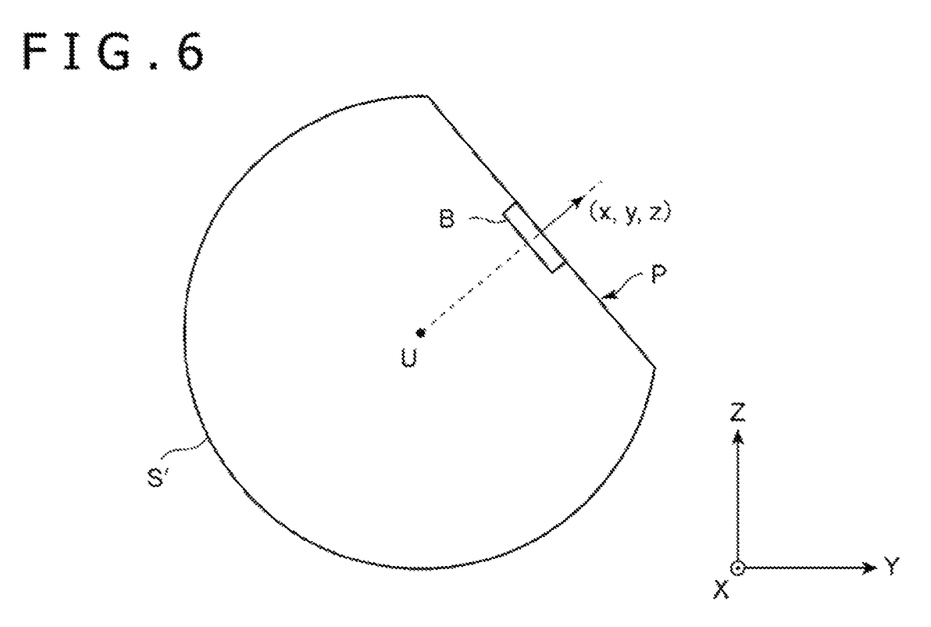
FIG. 6 is a diagram illustrating an example of still another projection plane established by the image processing apparatus according to the embodiment of the present invention.

As illustrated in FIG. 6, the projection plane setting unit 22 places a flat projection plane P to which the vector representing the information is normal, at a position that is a predetermined distance L spaced from the position of the user's viewpoint. Furthermore, the projection plane setting unit 22 places a spherical projection plane S' whose radius is represented by R (R>L) and whose center is located at the position U of the user's viewpoint, and sets a projection plane shaped as the spherical projection plane S' severed by the flat projection plane P.

The background generator 23 projects the panoramic image data acquired by the acquirer 21 onto the projection plane set by the projection plane setting unit 22, thereby generating background image data.

Moreover, the synthesis processor 25 accepts an instruction as to which one of the planes of a circumscribed rectangular parallelepiped B circumscribed around virtual objects M1, M2, . . . included in the model image data is to be aligned with the flat projection plane P. This instruction includes information specifying which one of the ξ-, η-, and ζ-axes is normal to the plane and also whether the plane is on the side of a positive or negative direction along the axis normal to the plane.

The synthesis processor 25 rotates the three-dimensional image data such that the axis that is normal to the plane specified by the information is aligned with the line normal to the flat projection plane P, i.e., a line segment in a direction represented by the vector (x, y, z), and translates the three-dimensional image data such that the plane specified by the information is in contact with the projection plane P, thereby placing the three-dimensional image data.

According to this example, a control sequence is performed to move the virtual viewpoint of the user to the position where the three-dimensional image data are placed, while performing a control sequence to gradually reduce the angle of view from an initial angle of view, i.e., to make the virtual space look larger, thereby realizing a rendition to enter a game space represented by the three-dimensional image data applied to a wall surface.

Furthermore, in case a plurality of three-dimensional image data are placed, the user can be presented with a virtual image where the three-dimensional image data are placed in various directions by designating directions of flat projection planes with respect to the respective three-dimensional image data. In this example, it is possible to create a rendition to allow the user to select three-dimensional image data and enter a game space represented by the selected three-dimensional image data.

[Ending Process]

When an application such as a game is ended, the synthesis processor 25 may create a rendition such that the user comes back, into a projection plane where three-dimensional image data are placed. In this case, the synthesis processor 25 stores synthesized image data in the storage 12, and, when an application such as a game is ended, the synthesis processor 25 performs a control sequence to gradually increase the angle of view until it reaches the initial angle of view from the position where the three-dimensional image data corresponding to the ended application are placed, i.e., to make the virtual space look smaller, and also performs a control sequence to move the virtual viewpoint of the user from the position where the three-dimensional image data are placed toward the center of the world coordinate system, thereby rendering, generating, and displaying an image in the visual field, i.e., a visual field image, to be presented to the user on the basis of the synthesized image data stored.

In this manner, the user can be presented with a rendition that makes the user feel as if leaving the game space and coming back to reality.

[Setting of a Projection Plane Based on the Distance from the Position of a Viewpoint]

Figure 5:
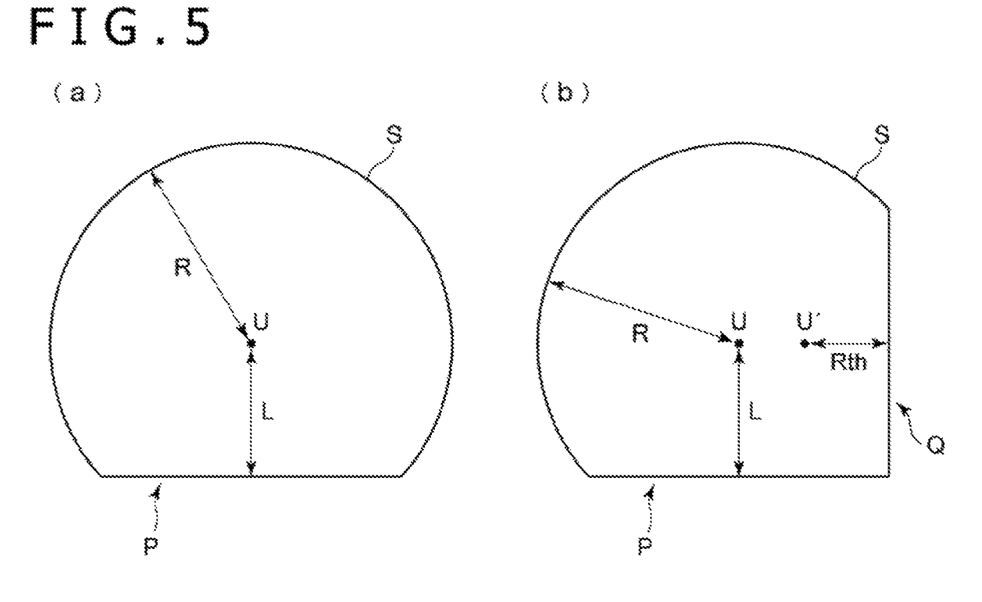
FIG. 5 is a diagram illustrating an example of other projection planes established by the image processing apparatus according to the embodiment of the present invention.

When the position of the user's viewpoint has moved from its initial position, the projection plane may be changed dynamically depending on the details of the movement. According to an example of the present embodiment, specifically, as schematically illustrated in FIG. 4, the projection plane setting unit 22 places a flat projection plane P that is the distance L lower than the position U of the initial viewpoint of the user, and makes a projection plane above the projection plane P as a part S of a sphere whose radius is represented by R (R>L) and whose center is located at the position U of the user's initial viewpoint (FIG. 5(*a*)).

Thereafter, the synthesis processor 25 tracks movement of the user's head, i.e., detects movement of the user's head at predetermined timings, detects the position and direction of the user's head, and acquires information about the position U of the user's viewpoint and the direction of the line of sight of the user. If the distance between the acquired position U' of the user's viewpoint and the projection plane is smaller than a predetermined distance Rth (Rth<R), then the synthesis processor 25 outputs the acquired information about the position of the user's viewpoint and the direction of the line of sight of the user to the projection plane setting unit 22.

The projection plane setting unit 22 that has received the information about the position U' of the user's viewpoint and the direction of the line of sight of the user sets a flat projection plane Q to which the direction of the line of sight of the user is normal, at a position that is a predetermined distance L spaced from the entered position U' of the user's viewpoint in the direction of the line of sight of the user (FIG. 5(*b*)).

Then, the background generator 23 projects the panoramic image data acquired by the acquirer 21 onto the projection plane, including the projection plane Q, set by the projection plane setting unit 22, thereby generating background image data.

In this example, when the user moves closely to a wall or the like, the image of a portion of the panoramic image data which lies in the direction in which the user has moved closely to the wall or the like is presented as a background on a flat projection plane that is virtually placed in that direction. When the user changes the direction of the line of sight thereof, the direction of the line normal to the flat projection plane is dynamically changed into alignment with the direction of the light of sight. The user is now able to recognize chat the user naturally is moving closely to the wall.

The distance L may be of a predetermined value. Alternatively, if three-dimensional image data are placed in the direction of the projection plane Q, then the distance L may be a distance up to a plane to which the direction of the line of sight of the user is normal and which is circumscribed around the three-dimensional image data.

[Rendering of a Shadow]

In an example of the present embodiment, the synthesis processor 25 may render and generate an image in the range of the user's visual field in the direction of the line of sight of the user, i.e., a visual field image, as viewed from the position of the user's viewpoint specified by the acquired information, and may also render a shadow as follows: When a virtual light source is placed in a predetermined light source position, the synthesis processor 25 may synthesize the image of a shadow, i.e., shadow image data, to be formed on a projection plane by blocking light from the light source with a virtual object based on model image data, with background image data, and plot the synthesized shadow. Since the shape of the plotted shadow and the process of plotting the shadow are similar to those according to a general rendering process, they will not be described in detail below. According to an example of the present embodiment, as illustrated in FIG. 4, inasmuch as the flat projection plane P is the distance L, which corresponds to the position of the bottom plane of the model image data, lower than the position U of the user's viewpoint, the shadow of the virtual object is synthesized with a part of the panoramic image data projected onto the projection plane P, i.e., mapped as texture. Therefore, the shadow of the virtual object disposed on the bottom plane of the model image data is plotted in contact with the bottom plane, making the user feel less strange and awkward than if the projection plane is spherical.

REFERENCE SIGNS LIST

10 Image processing apparatus
11 Controller
12 Storage
13 Interface
20 Operating device
21 Acquirer
22 Projection plane setting unit
23 Background generator
24 Model image processor
25 Synthesis processor
26 Output unit
30 Relay controller
40 Display device
51 Video display element
52 Optical element

The invention claimed is:

1. An image display system including:
a display device to be mounted on the head of a user; and
an image processing apparatus connected to the display device; wherein
the image processing apparatus comprises:
means that acquires panoramic image data representing a captured image around the user and generates background image data representing the panoramic image data projected onto a projection surface having a predetermined shape that is virtually disposed around a position of a user's viewpoint in a virtual space,
wherein the predetermined shape is a rectangular parallelepiped, and
wherein a bottom plane of the projection surface is parallel to a floor surface;
means that synthesizes model image data generated on a basis of predetermined three-dimensional model data with the background image data, thereby generating synthesized image data; and
output means that outputs a visual field image of the user generated on the basis of the synthesized image data to the display device.

2. An image processing apparatus connected to a display device to be mounted on a head of a user, comprising:
means that acquires panoramic image data representing a captured image around the user and generates background image data representing the panoramic image data projected onto a projection surface having a predetermined shape that is virtually disposed around the position of a user's viewpoint in a virtual space;
means that synthesizes model image data generated on the basis of predetermined three-dimensional model data with the background image data, thereby generating synthesized image data; and
output means that outputs a visual field image of the user generated on the basis of the synthesized image data to the display device,
wherein the predetermined shape is a rectangular parallelepiped, and
wherein a bottom plane of the projection surface is parallel to a floor surface.

3. The image processing apparatus according to claim 2, wherein
the means that generates the synthesized image data synthesizes shadow image data generated on the basis of the three-dimensional model data as well as the model image data with the background image data.

4. A method of controlling an image processing apparatus connected to a display device to be mounted on a head of a user, comprising:
acquiring panoramic image data representing a captured image around the user and generating background image data representing the panoramic image data projected onto a projection surface having a predetermined shape that is virtually disposed around a position of a user's viewpoint in a virtual space;
synthesizing model image data generated on a basis of predetermined three-dimensional model data with the background image data, thereby generating synthesized image data; and
outputting a visual field image of the user generated on the basis of the synthesized image data to the display device,
wherein the predetermined shape is a rectangular parallelepiped, and wherein a bottom plane of the projection surface is parallel to a floor surface.

5. A non-transitory computer readable medium having stored thereon a program for a computer connected to a display device to be mounted on a head of a user, the program comprising:

by acquiring means, acquiring panoramic image data representing a captured image around the user and generating background image data representing the panoramic image data projected onto a projection surface having a predetermined shape that is virtually disposed around a position of a user's viewpoint in a virtual space;

by synthesizing means, synthesizing model image data generated on a basis of predetermined three-dimensional model data with the background image data, thereby generating synthesized image data; and by output means, outputting a visual field image of the user generated on the basis of the synthesized image data to the display device, wherein the predetermined shape is a rectangular parallelepiped, and wherein a bottom plane of the projection surface is parallel to a floor surface.

* * * * *